United States Patent [19]

Roentgen et al.

[11] 4,170,688
[45] Oct. 9, 1979

[54] PROCESS FOR BONDING AN IMPROVED METALLIC SUPPORT MEMBER TO GLASS SURFACES

[75] Inventors: Paul Roentgen, Roetgen; Hubert Simons, Wuerselen-Bardenberg; Werner Nuding, Aachen-Haaren, all of Fed. Rep. of Germany

[73] Assignee: Saint-Gobain Industries, Neuilly-sur-Seine, France

[21] Appl. No.: 922,344

[22] Filed: Jul. 6, 1978

[30] Foreign Application Priority Data

Sep. 7, 1977 [DE] Fed. Rep. of Germany ....... 2731100

[51] Int. Cl.² .................. B32B 17/10; B32B 27/42
[52] U.S. Cl. ..................... 428/433; 156/89; 156/327; 350/288; 428/432; 428/437; 428/469; 428/471; 428/83; 428/192
[58] Field of Search ............ 428/433, 437, 432, 471, 428/469, 83, 192; 156/89, 327

[56] References Cited

U.S. PATENT DOCUMENTS

| 2,385,580 | 9/1945 | Knox | 428/433 |
|---|---|---|---|
| 2,475,469 | 7/1949 | Bennett | 428/433 |
| 2,935,422 | 5/1960 | Chester | 428/437 |
| 2,980,553 | 4/1961 | Sullivan | 428/341 |
| 3,407,091 | 10/1968 | Busdiecker | 428/433 |
| 3,427,096 | 2/1969 | Dykema | 428/433 |
| 3,471,356 | 10/1969 | Kolb | 428/315 |
| 3,889,026 | 6/1975 | Groth | 428/433 |

FOREIGN PATENT DOCUMENTS

| 1256846 | 12/1967 | Fed. Rep. of Germany . |
|---|---|---|
| 2215592 | 10/1972 | Fed. Rep. of Germany . |
| 246594 | 2/1926 | United Kingdom . |
| 583208 | 12/1946 | United Kingdom . |
| 645507 | 11/1950 | United Kingdom . |
| 686519 | 1/1953 | United Kingdom . |
| 691984 | 5/1953 | United Kingdom . |
| 860418 | 2/1961 | United Kingdom . |
| 963469 | 7/1964 | United Kingdom . |
| 971131 | 9/1964 | United Kingdom . |
| 1355307 | 6/1974 | United Kingdom . |

*Primary Examiner*—Ellis P. Robinson
*Attorney, Agent, or Firm*—Pennie & Edmonds

[57] ABSTRACT

The invention disclosed provides a new improved metallic support member and process for bonding the metallic support member to a glass surface by means of an intermediate vitreous coating.

7 Claims, 3 Drawing Figures

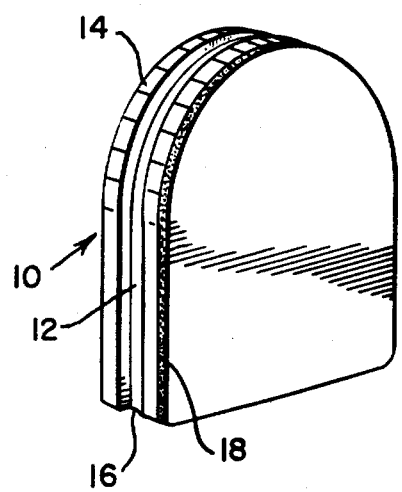
Fig. 1
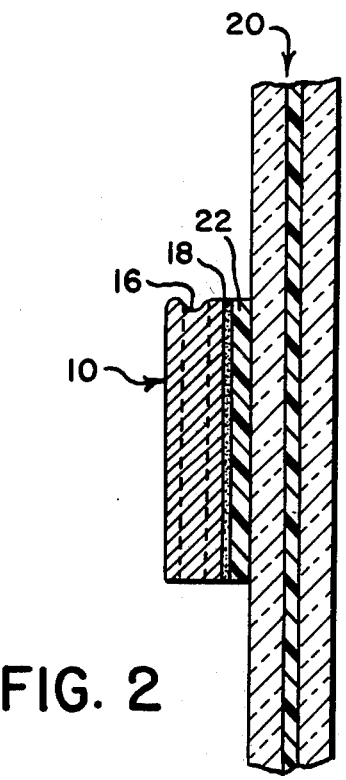
FIG. 2
FIG. 3
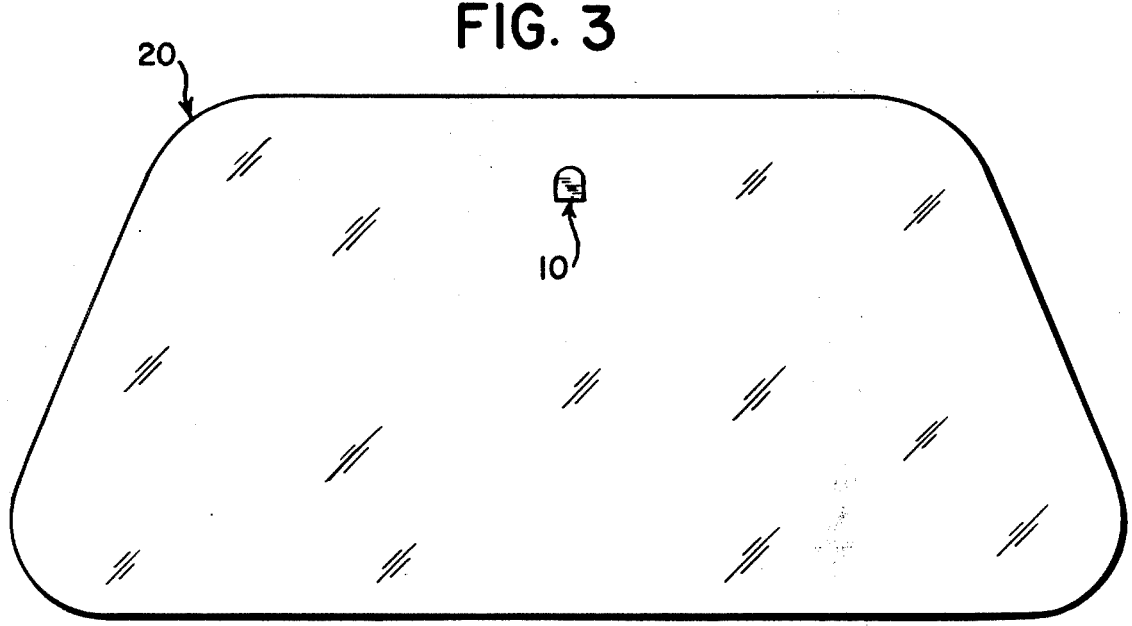

PROCESS FOR BONDING AN IMPROVED METALLIC SUPPORT MEMBER TO GLASS SURFACES

FIELD OF THE INVENTION

The present invention relates to a process for bonding a metallic support member to a glass surface by means of an intermediate vitreous coating whereby the metallic support member becoms more permanently secured in bonded position.

BACKGROUND OF THE INVENTION

Numerous attempts have been made in the prior art to bond metal parts to glass surfaces such as rear-view mirror assemblies to the inner surface of an automobile windshield. In one known prior art method, a rear-view mirror assembly is securable to a flat metallic supporting member which is attached to the inner side of an automobile windshield by means of a thermoplastic adhesive layer using heat and pressure. After the flat metallic supporting member is attached to the windshield, the windshield is inserted into the body of the automobile and the remaining portion of the rear-view mirror assembly is fastened onto the metallic support. Examples of prior art disclosures which illustrate this method include French Pat. No. 1,226,901; U.S. Pat. No. 3,130,103; German Offenlegungsschrift No. 2,604,030; and German Offenlegungsschrift No. 2,632,164.

Because the surface of the metallic supporting member which is bonded to the glass surface is relatively small and coupled with the relatively large mechanical stresses of the rear-view mirror assembly, it has been recognized in the prior art that a firm durable bond between the metallic supporting member and the glass surface must be established.

Adhesives which have been found to perform satisfactory in the prior art include adhesive strips made of polyvinyl butyral. These adhesive strips have an excellent adhesive affinity for silicate glass, and are currently used nearly all over the world as a self-adhesive thermoplastic intermediate layer in laminated safety glass panes.

It is also known from experience that the material composition of the supporting member is of decisive importance for the quality of the bond. Moreover, it has been known that the frequently observed detachment of the metallic supporting member is due to the difference between the coefficients of thermal expansion of the metal and the silicate glass. Primarily for this reason it has been proposed that the metallic supporting member be prepared from a material whose coefficient of expansion is about the same as that of the silicate glass of the windshield. This attempted solution is essentially disclosed in French Pat. No. 1,226,901. Some improvement may be brought about also by using a relatively soft bond which is capable of equalizing the stresses produced by differential thermal expansion. However, soft bonding often proves ineffective in supporting the mirror assembly in position.

To prevent this last-mentioned defect, a method has been proposed for preparing the plate-like supporting member from silicate glass such as that disclosed also in French Pat. No. 1,226,901. While this method makes it possible to obtain a good bond, the suppporting members produced from silicate glass have many other serious drawbacks such that this proposal has not received either practical or commercial acceptance.

It has now been found that by practice of the present invention, the difficulties and disadvantages of prior art attempts to secure a rear-view mirror assembly to the surface of a glass windshield are now overcome in a simple, highly efficient manner.

SUMMARY OF THE INVENTION

The present invention, generally stated, relates to a process for bonding a metallic support member to a glass surface by means of an intermediate vitreous coating. The present invention also provides, in combination, a new improved metallic support having a vitreous coating securable to a glass surface. The metallic support member effectively maintains a rear-view mirror assembly in position on the windshield of an automobile.

It is an object of the present invention to provide a metallic supporting member which is securable by an intermediate vitreous coating onto a glass surface to support a rear-view mirror assembly by means of a highly efficient and durable bond.

It is also an object of the present invention to provide an improved process for bonding a metallic support member having an intermediate vitreous coating disposed thereon onto a glass surface.

It is another object of this invention to provide an improved process for bonding metal particles onto glass surfaces in a highly efficient, durable manner.

These objects as well as additional objects and advantages will become more apparent from the following detailed description of the preferred embodiments taken in conjunction with the figures wherein:

FIG. 1 illustrates a perspective view of a metallic support member prepared by the process of the present invention;

FIG. 2 illustrates a cross-sectional view of an automobile windshield having a metallic support member bonded thereto according to practice of the present invention; and FIG. 3 illustrates a partial front elevational view of an automobile windshield having the metallic support member bonded thereto in accordance with the present invention.

DETAILED DESCRIPTION OF THE PREFERRED EMBODIMENTS

Practice of the present invention will become more apparent from the drawings wherein similar elements will be identified by similar numerals throughout the several views.

In FIG. 1 metallic support member 10 is illustrated as a normally plate-like element 12 having plane-parallel surfaces, the upper part 14 of which may be wedge-shaped or, as illustrated, having a rounded upper surface. The metallic supporting member 12 includes groove 16 within which is engaged a mating projection in the attaching portion of the base of a rear-view mirror assembly which may be slipped onto the metallic supporting member and secured in position.

Onto one surface of the plate-like element 12, a vitreous layer 18 is applied to serve as an intermediate layer for bonding the metallic support member 10 onto the surface of a glass windshield 20.

As more clearly illustrated in FIG. 2, metallic support member 10 includes a vitreous layer 18 secured along one side thereof intermediate the metallic support member and the windshield to which it is attached by means of an adhesive strip 22. The adhesive strip 22 preferably is composed of polyvinyl butyral combined with about 21 to 32% by weight plasticizer. The bonding effect of the polyvinyl butyral may be achieved by known methods available in the prior art using heat and pressure processing techniques. Thus, the metallic support member 10 may be bonded to an automobile windshield after manufacture of the windshield and prior to assembly thereof within the automobile body as more clearly illustrated in FIG. 3.

In FIG. 3, automobile windshield 20 is illustrated with metallic support member 10 in position and is adaptable to receive rear-view mirror assembly in a convenient, highly effective manner.

Bonding according to the invention is achieved by providing the metallic support member with a vitreous coating of an enamel or glaze-like coating on the surface which is to be bonded to the windshield.

By bonding the metallic support member by practice of the present invention to the glass surface of the windshield, there are achieved significant advantages over known attempts in the prior art. On the one hand, it is possible to continue using metallic support members, while, on the other hand, the bond between the metallic support member and the adhesive layer attains the same strength as that existing when the adhesive layer is applied to a silicate glass support member and the surface of the windshield. This result is achieved by simply providing a surface of the metallic support surface with a surface having characteristics similar to silicate glass. It has also been found that the strength of the bond between the enamel or glaze-coated metal surface and the adhesive layer attains values that can be higher than those realized between the adhesive layer and the glass windshield. This resultant advantage may be explained by the fact that when an enamel layer is applied a short time before the bonding operation, it exhibits a highly reactive surface which improves the bonding strength with the adhesive. A further advantage accrues from the fact that as a result of the enamel coating, specific metallic surface defects can be eliminated. It is, thus, possible to make use of more economical materials, and obtain a bond which is independent of the type of metal used, while providing a bonding strength which corresponds to the glass-to-glass bond known in the art.

In order to produce the enamel or glaze-like coating, it is preferable to use ceramic materials which may be fired at temperatures of about 550° to about 650° C. The ceramic materials may be color formulated if desired.

A composition of enamel usefully employed herein is available under the description of Ceramic Color No. 15710/80654 by the DEGUSSA Co. The enamel may be applied to the surface of the metallic support member at room temperature, such as with a roller or by the silk screen process techniques following which it is fired at a temperature of approximately 600° C.

The superiority of the bond produced according to the invention is illustrated by the following example:

EXAMPLE 1

Commercially available supporting members consisting of sintered metal were bonded to glass windshields by the previously known method, on the one hand, and by the method according to the present invention but otherwise under the same conditions. The only distinction was that one sample was metal-adhesive-glass bond labeled prior art sample, and the other was a metal-vitreous layer-adhesive-glass bond labeled present invention sample. The quality of the bond was tested by applying a torque to each metallic support member and determining the magnitude of the torque at which the metallic support member detached from the glass windshield. Whereas in the case of the bond prepared by the prior-art method, the metallic support members detached at 4 and 5 mkgf. The metallic support members bonded according to the present invention detached at 8 to 9 mkgf. In the prior art samples, the bond always detached at the metal-polyvinyl butyral interface, while in the present invention samples, the detachment as a rule no longer occurred at the adhesive surfaces themselves but resulted from destruction of the adhesive strip of from the detachment of the enamel layer from the metal surface.

From the foregoing, it will be readily apparent to those skilled in the art that various modifications and changes may be effected herein without departing from the practice of the presently disclosed invention.

What is claimed is:

1. A process for bonding a metal part to a glass surface, which comprises applying an intermediate vitreous enamel coating to the metal part, and securing the metal part to the glass surface by means of a thermoplastic adhesive disposed between the vitreous enamel coating and the glass surface, said metal part being a support member for attachment of a rear-view mirror assembly and said glass surface being the inner side of an automobile glass windshield.

2. The process according to claim 1 wherein the enamel coating is produced by ceramic coating which is fired at temperatures of 550° to about 650° C.

3. The process according to claim 1 wherein the thermoplastic adhesive is polyvinyl butyral containing 21% to 30% by weight plasticizer.

4. A metallic support member bonded to a glass surface by a thermoplastic adhesive characterized in that the metallic support member includes a vitreous coating disposed on the surface thereof facing the glass surface and in direct contact with said thermoplastic adhesive.

5. The metallic support member of claim 4 wherein the intermediate vitreous coating is an enamel surface.

6. In a glass windshield having a metallic supporting member bonded to the glass surface by a thermoplastic adhesive for attachment thereto of a rear-view mirror assembly, the improvement which comprises an intermediate vitreous coating disposed on the metal surface of the member which is adhesively bonded to the windshield.

7. The glass windshield of claim 6 wherein the vitreous coating is an enamel coating.

* * * * *